(12) United States Patent
Goh et al.

(10) Patent No.: US 11,932,213 B2
(45) Date of Patent: Mar. 19, 2024

(54) SYSTEM AND METHOD FOR CONTROLLING ONE OR MORE BRAKES OF A VEHICLE

(71) Applicant: Toyota Research Institute, Inc., Los Altos, CA (US)

(72) Inventors: Yan Ming Jonathan Goh, Palo Alto, CA (US); Alexander R. Green, Redwood City, CA (US); Michael Thompson, San Juan Capistrano, CA (US); Kazunori Nimura, Novi, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 495 days.

(21) Appl. No.: 17/213,892

(22) Filed: Mar. 26, 2021

(65) Prior Publication Data
US 2022/0306064 A1 Sep. 29, 2022

(51) Int. Cl.
*B60T 13/68* (2006.01)
*B60T 8/171* (2006.01)
*B60T 8/1755* (2006.01)
*B60T 13/16* (2006.01)

(52) U.S. Cl.
CPC ............ *B60T 13/686* (2013.01); *B60T 8/171* (2013.01); *B60T 8/17558* (2013.01); *B60T 13/161* (2013.01); *B60T 2220/04* (2013.01); *B60T 2270/82* (2013.01); *B60T 2270/88* (2013.01)

(58) Field of Classification Search
CPC .... B60T 13/686; B60T 8/171; B60T 8/17558; B60T 13/161; B60T 2220/04; B60T 2270/82; B60T 2270/88
USPC ........................................................... 701/70
See application file for complete search history.

(56) References Cited

U.S. PATENT DOCUMENTS

| 5,558,408 | A | * | 9/1996 | Naedler | .................. B60T 17/16 |
| | | | | | 92/24 |
| 8,702,181 | B2 | | 4/2014 | Drumm | |
| 10,167,015 | B2 | | 1/2019 | Rust et al. | |
| 2007/0198145 | A1 | * | 8/2007 | Norris | ....................... B60T 7/22 |
| | | | | | 701/23 |
| 2008/0048491 | A1 | * | 2/2008 | Matsubara | ................ B60T 8/36 |
| | | | | | 303/14 |

(Continued)

FOREIGN PATENT DOCUMENTS

| EP | 2067675 | B1 | * | 12/2013 | ............ B60T 13/683 |
| EP | 3168096 | A1 | * | 5/2017 | .............. B60T 11/16 |

(Continued)

*Primary Examiner* — Tuan C To
(74) *Attorney, Agent, or Firm* — Christopher G. Darrow; Darrow Mustafa PC

(57) ABSTRACT

Systems and methods are provided for controlling one or more brakes of the vehicle. The system may include a processor and a memory in communication with the processor with a brake control module. The brake control module includes instructions that, when executed by the processor, cause the processor to control the one or more brakes of the vehicle when the vehicle is in a first mode using a brake-by-wire system. When the vehicle is in a second mode, control the brake-by-wire system such that the one or more brakes of the vehicle are controlled using a mechanical braking system and the brake-by-wire system.

14 Claims, 4 Drawing Sheets

(56) References Cited

U.S. PATENT DOCUMENTS

| | | | | |
|---|---|---|---|---|
| 2008/0086241 | A1* | 4/2008 | Phillips | G05D 1/0038 |
| | | | | 701/2 |
| 2008/0284242 | A1 | 11/2008 | Ganzel | |
| 2010/0259096 | A1* | 10/2010 | Rieth | B60T 8/4081 |
| | | | | 303/116.1 |
| 2013/0345913 | A1* | 12/2013 | Krueger | B60T 8/17 |
| | | | | 701/22 |
| 2014/0346852 | A1* | 11/2014 | Thrasher | B60T 8/4081 |
| | | | | 303/10 |
| 2017/0137006 | A1* | 5/2017 | Kuhlman | B60T 13/146 |
| 2018/0056964 | A1* | 3/2018 | Pennala | B60T 17/22 |
| 2018/0162339 | A1* | 6/2018 | Irwan | B60T 8/00 |
| 2020/0070792 | A1* | 3/2020 | Bauer | B60T 8/409 |

FOREIGN PATENT DOCUMENTS

| | | | | |
|---|---|---|---|---|
| EP | 3333031 | A1 * | 6/2018 | B60T 13/18 |
| WO | 2007042432 | A1 | 4/2007 | |
| WO | WO-2019168465 | A1 * | 9/2019 | B60R 16/023 |
| WO | WO-2020043577 | A1 * | 3/2020 | B60T 7/04 |

\* cited by examiner

SYSTEM AND METHOD FOR CONTROLLING ONE OR MORE BRAKES OF A VEHICLE

TECHNICAL FIELD

The subject matter described herein relates, in general, to systems and methods for controlling one or more brakes of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Traditionally, the brakes of vehicles were controlled through the movement of a fluid or gas through one or more brake lines in response to a force exerted on a brake pedal by an operator of a vehicle. Moreover, mechanical pressure exerted on the brake pedal by an operator is converted into hydraulic or pneumatic pressure by a master cylinder. Pressure within the master cylinder would send the fluid or gas through one or more brake lines, which would then either engage a piston to move a brake caliper that would frictionally engage a disc, in the case of disc brakes, or press a shoe onto a brake drum, in the case of drum brakes.

More recently, brake-by-wire technology has been developed wherein forces exerted on the brake pedal by the operator are used as a sensor input to determine how much braking the operator would like a braking system to exert. In response to the sensor input information, the braking system then provides the appropriate fluid or gas to the brake lines and/or utilizes one or more electrical motors to control one or more brakes of the vehicle. Brake-by-wire systems have advantages in that they are generally more reliable, cheaper to manufacture, and can actuate the brakes more rapidly than traditional systems. However, brake-by-wire systems have disadvantages, including providing the operator with less responsive feedback and a requirement for electrical power, which may not be possible in emergencies.

SUMMARY

This section generally summarizes the disclosure and is not a comprehensive explanation of its full scope or all its features.

In one embodiment, a system for controlling one or more brakes of a vehicle may include a processor and a memory in communication with the processor. The memory may have a brake control module. The brake control module includes instructions that, when executed by the processor, cause the processor to control the one or more brakes of the vehicle when the vehicle is in a first mode using a brake-by-wire system. When the vehicle is in a second mode, the brake control module causes the processor to control the brake-by-wire system such that the one or more brakes of the vehicle are controlled using a mechanical braking system and the brake-by-wire system. The first mode may be an autonomous mode where the vehicle acts as an autonomous vehicle, and the second mode may be a shared control mode, where the control of the one or more brakes is shared between the brake-by-wire system and the mechanical braking system. In this shared control mode, the vehicle may act as a semi-autonomous or non-autonomous vehicle.

In another embodiment, a method for controlling one or more brakes of the vehicle may include the steps of controlling the one or more brakes of the vehicle when the vehicle is in a first mode using a brake-by-wire system and, when the vehicle is in a second mode, controlling the brake-by-wire system such that the one or more brakes of the vehicle are controlled using a mechanical braking system and the brake-by-wire system. Like before, the first mode may be an autonomous mode where the vehicle acts as an autonomous vehicle, and the second mode may be a shared control mode, where the control of the one or more brakes is shared between the brake-by-wire system and the mechanical braking system. In this shared control mode, the vehicle may act as a semi-autonomous or non-autonomous vehicle.

In still another embodiment, a non-transitory computer-readable medium may have instructions that, when executed by a processor, cause the processor to control one or more brakes of a vehicle when the vehicle is in a first mode using a brake-by-wire system and, when the vehicle is in a second mode, control the brake-by-wire system such that the one or more brakes of the vehicle are controlled using a mechanical braking system and the brake-by-wire system. Again, the first mode may be an autonomous mode where the vehicle acts as an autonomous vehicle, and the second mode may be a shared control mode, where the control of the one or more brakes is shared between the brake-by-wire system and the mechanical braking system. In this shared control mode, the vehicle may act as a semi-autonomous or non-autonomous vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a brake control system and related method for controlling one or more brakes of a vehicle. The vehicle may operate in at least two different modes. In a first mode, referred to as an autonomous mode, the vehicle operates as an autonomous vehicle that requires little to no input from the operator to pilot the vehicle from one point to another. In a second mode, referred to as a shared control mode, the control of one or more brakes is shared between the brake-by-wire system and the mechanical braking system. The shared control mode may be a mode where the vehicle acts as a semi-autonomous or non-autonomous vehicle and requires input from the operator to travel from one destination to another.

When the vehicle is in the autonomous mode, the brake control system has a brake-by-wire system that controls the operation of the vehicle's brakes. When the vehicle is in a shared control mode, the brake control system provides for shared control of the brakes of the vehicle using both the brake-by-wire system and a mechanical braking system.

Moreover, when the operator of the vehicle actuates a brake pedal or some other input device, the vehicle may switch from the autonomous mode to the shared control mode. When in the shared control mode, pressure generated within a master cylinder caused by the actuation of the brake pedal is provided to a valve system that also receives pressure from the brake-by-wire system. The valve system, which may be a shuttle valve, will provide at least a portion of the pressure to the vehicle's brakes from whichever system has the higher pressure. As such, if the pressure from the master cylinder is greater, at least a portion of the pressure from the master cylinder is used to control the vehicle's brakes. Conversely, if the pressure from the brake-by-wire system is greater, at least a portion of that pressure is used to control the brakes of the vehicle.

In one example, when in the shared control mode, the brake-by-wire system may be instructed to generally not produce a pressure higher than that of the mechanical braking system, thus allowing the operator of the vehicle to control the brakes of the vehicle hydraulically or pneumatically by the master cylinder. Generally, this provides excellent pedal feedback to the operator. However, if it is determined that the vehicle may collide with another object or some other emergency arises, one or more active safety systems of the vehicle may instruct the brake-by-wire system to produce a higher pressure than that produced by the master cylinder, slowing the vehicle down or bringing the vehicle to a stop. This shared control provides the advantages of providing excellent pedal feedback and control to the driver but also allowing the brake-by-wire system to step in when necessary to prevent a collision or perform some other emergency maneuver.

Figure 1:
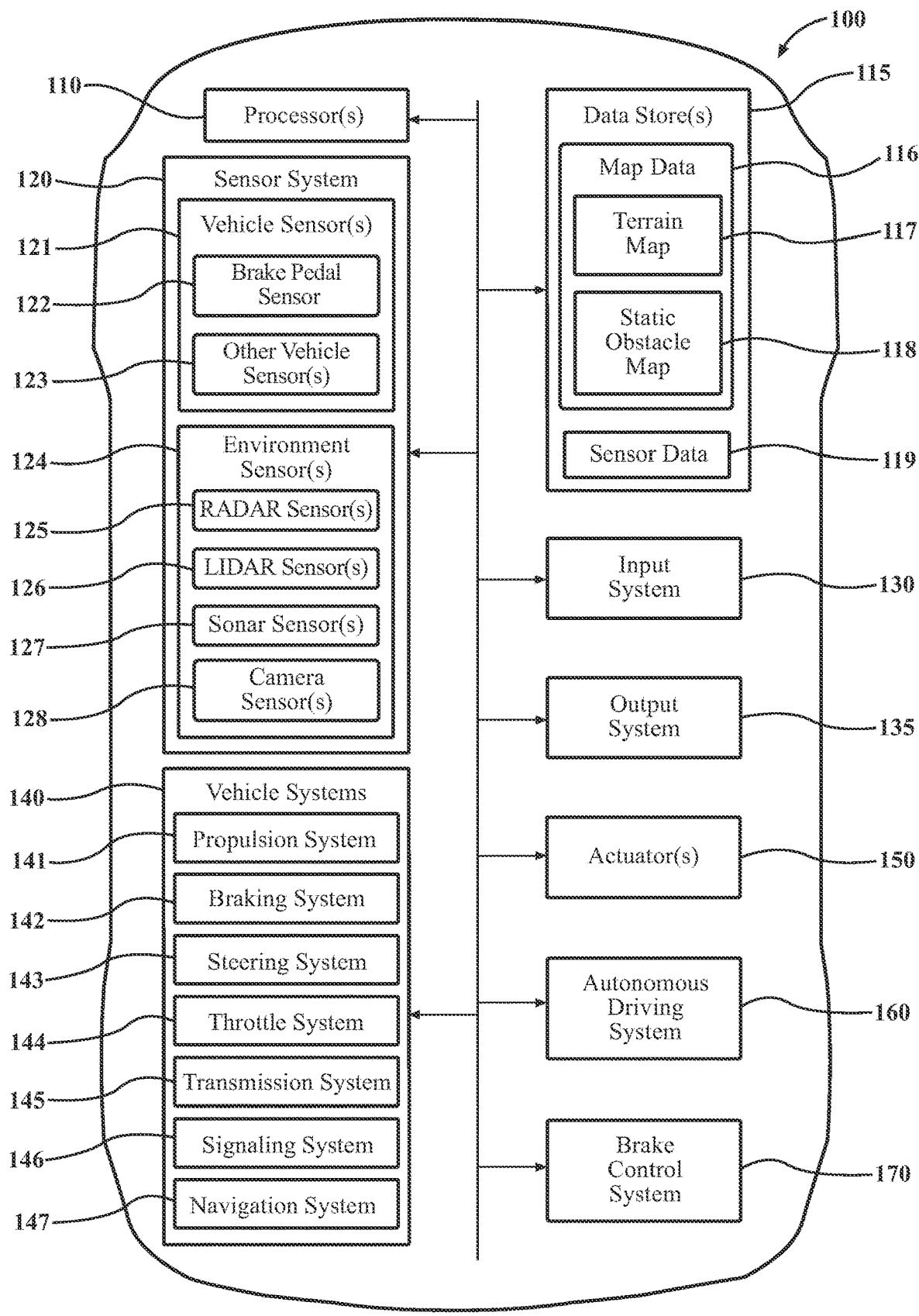
FIG. 1 illustrates a vehicle incorporating a brake control system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to an autonomous driving system 160.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a braking control system 170. The braking control system 170 may be incorporated within the autonomous driving system 160 or separate as shown. As explained in more detail later in this description, the braking control system 170 may control the braking system 142 of the vehicle 100.

Figure 2:
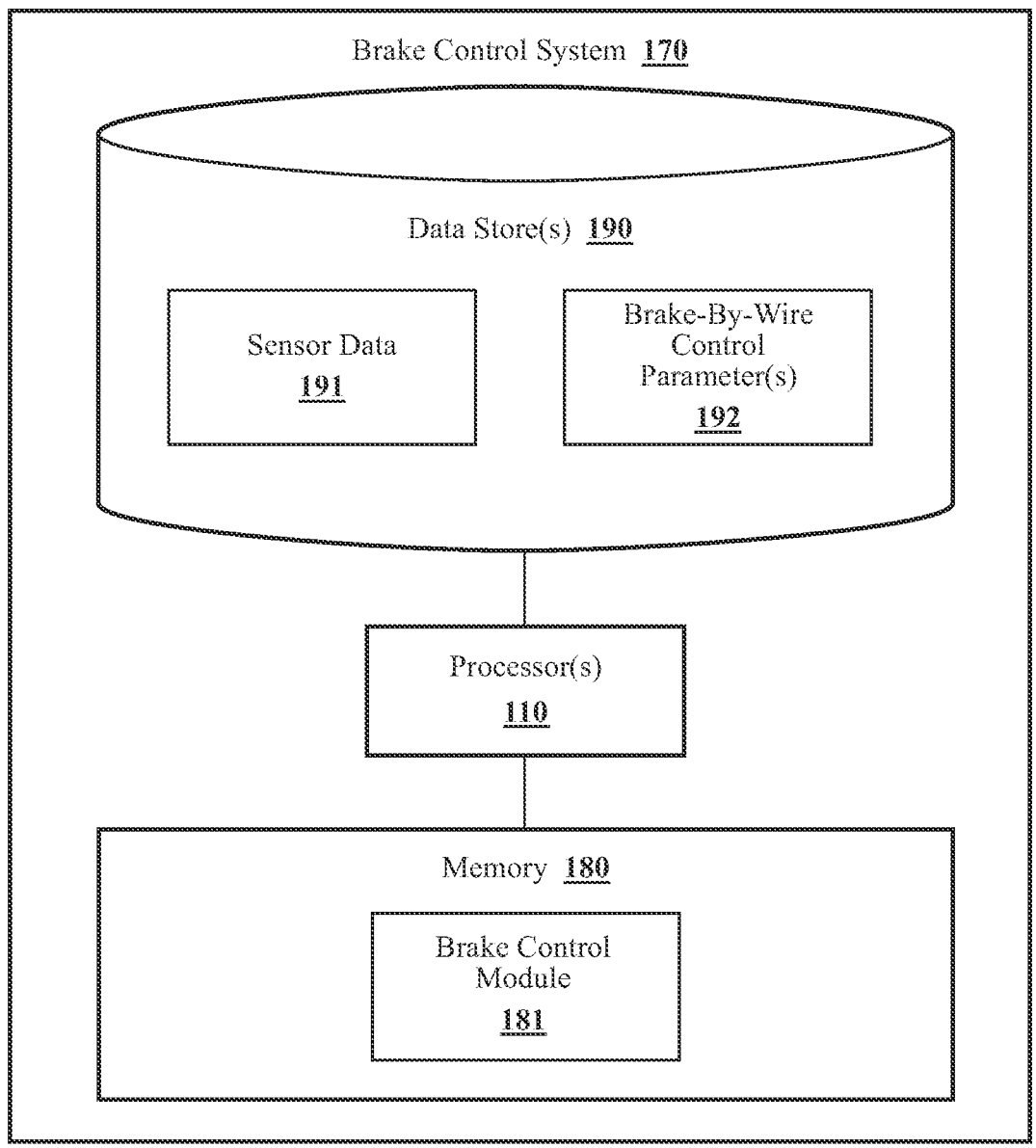
FIG. 2 illustrates a more detailed view of the brake control system of FIG. 1.

With reference to FIG. 2, one embodiment of the braking control system 170 is further illustrated. As shown, the braking control system 170 includes a processor(s) 110. Accordingly, the processor(s) 110 may be a part of the braking control system 170, or the braking control system 170 may access the processor(s) 110 through a data bus or another communication path. In one or more embodiments, the processor(s) 110 is an application-specific integrated circuit that is configured to implement functions associated with a brake control module 181. In general, the processor(s) 110 may be an electronic processor such as a microprocessor capable of performing various functions as described herein. In one embodiment, the braking control system 170 includes a memory 180 that stores the brake control module 181. The memory 180 is a random-access memory (RAM), read-only memory (ROM), a hard disk drive, a flash memory, or other suitable memory for storing the brake control module 181. The brake control module 181 is, for example, computer-readable instructions that, when executed by the processor(s) 110, cause the processor(s) 110 to perform the various functions disclosed herein.

Furthermore, in one embodiment, the braking control system 170 includes a data store(s) 190. The data store(s) 190 is, in one embodiment, an electronic data structure such as a database that is stored in the memory 180 or another memory and that is configured with routines that can be executed by the processor(s) 110 for analyzing stored data, providing stored data, organizing stored data, and so on. Thus, in one embodiment, the data store(s) 190 stores data used by the brake control module 181 in executing various functions. In one embodiment, the data store(s) 190 includes sensor data 191 and brake-by-wire control parameter(s) 192 and other information used by the brake control module 181.

Accordingly, the brake control module 181 generally includes instructions that function to control the processor(s) 110 to control the one or more brakes of the vehicle 100 when the vehicle 100 is in a first mode using a brake-by-wire system. When the vehicle 100 is in a second mode, the brake control module 181 generally includes instructions that function to control the processor(s) 110 to control the brake-by-wire system such that the one or more brakes of the vehicle are controlled using a mechanical braking system and the brake-by-wire system. As explained previously, the first mode may be an autonomous mode where the vehicle 100 acts as an autonomous vehicle and the second mode may be a semi-autonomous or non-autonomous mode, where the vehicle 100 requires an operator input to travel from one destination to another.

Figure 3:
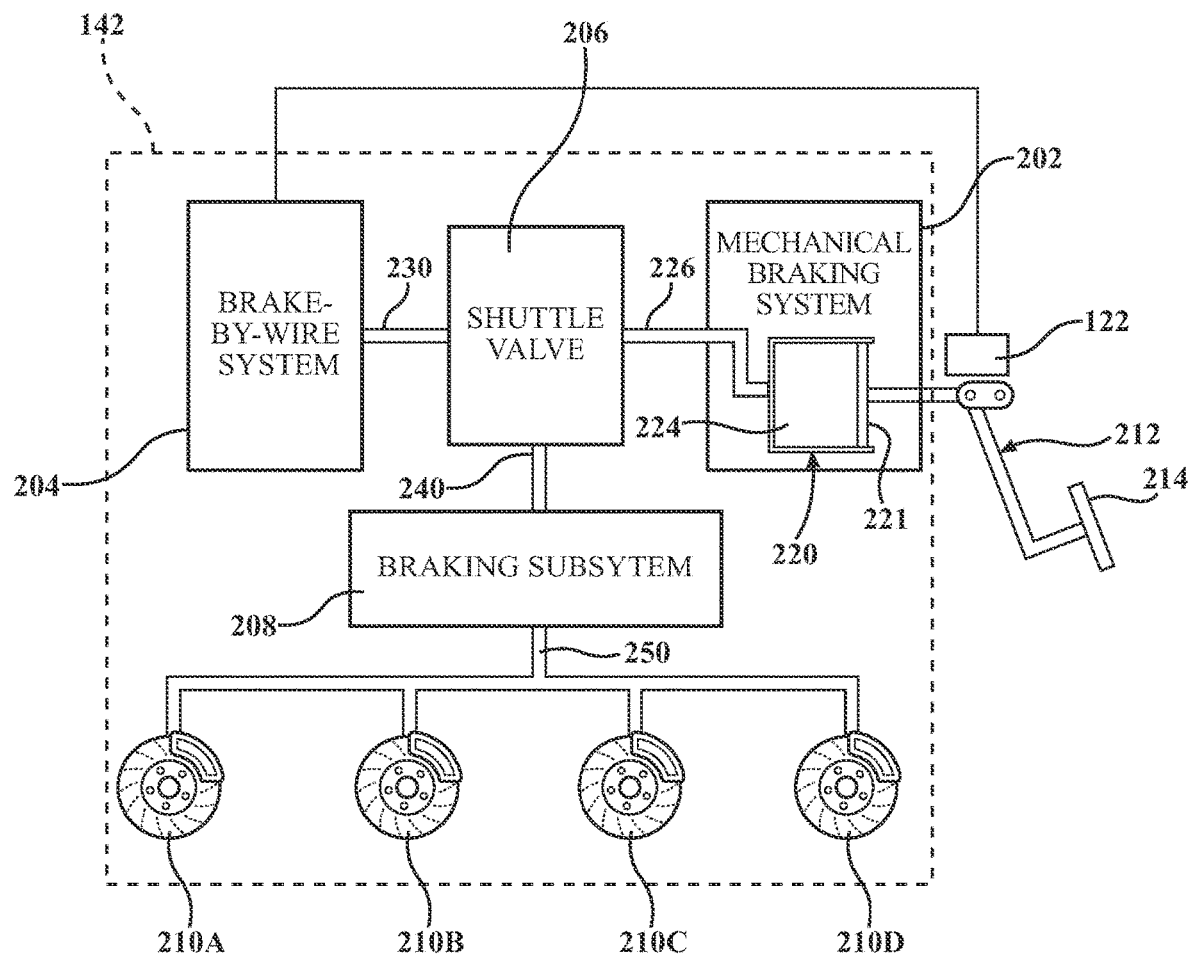
FIG. 3 illustrates a braking system that the brake control system of FIG. 2 may control.

Moreover, referring to FIG. 3, illustrated is a more detailed illustration of the braking system 142. Here, the braking system 142 includes a mechanical braking system 202 and a brake-by-wire system 204. Regarding the mechanical braking system 202, the mechanical braking system 202 may include a master cylinder 220 that includes a piston 221 and a chamber 224. The chamber 224 may be filled with a gas or fluid, such as a hydraulic fluid commonly used in vehicle braking systems. The piston 221 may be actuated by the movement of a brake pedal assembly 212 that may include a brake pedal 214 that an operator of the vehicle 100 may actuate. Moreover, as the operator of the vehicle 100 presses down on the brake pedal 214, the piston 221 moves such that pressure is generated within the chamber 224, as such the brake pedal 214 is in mechanical communication with the master cylinder 220, as the master cylinder 220 converts the mechanical force exerted by the operator on the brake pedal 214 into hydraulic or pneumatic pressure.

The increase of pressure within the chamber 224 causes fluid or gas to move into a line 226 that is connected to a valve system, which may be a shuttle valve 206. The shuttle valve 206 may be a single shuttle valve or may be multiple shuttle valves. Alternatively, instead of utilizing one or more shuttle valves, other valve systems could be utilized as well. For example, a smart valve can be utilized to receive fluid or gas having different pressures from two or more different sources. The smart valve can sense which fluid or gas has the greatest pressure and then pass this fluid or gas to an output line 240.

The brake-by-wire system 204 may be a hydraulic or pneumatic brake-by-wire system that may move a fluid or gas into the line 230, which is connected to the shuttle valve 206. Upon receiving a fluid or gas from the mechanical braking system 202 and the brake-by-wire system 204, the shuttle valve 206 will output to the output line 240 the fluid or gas having the greatest pressure. As such, if the pressure generated by the mechanical braking system 202 is greater than the pressure generated by the brake-by-wire system 204, the output line 240 will output at least a portion of the fluid or gas from the line 226 to the output line 240. Conversely, if the pressure of the fluid or gas generated by the brake-by-wire system 204 and provided to the shuttle valve 206 by the line 230 is greater than that provided by the mechanical braking system 202, the shuttle valve 206 will output at least a portion of this fluid or gas to the output line 240.

The fluid or gas outputted by the output line 240 of the shuttle valve 206 may be provided to a braking subsystem 208 and/or directly provided to one or more brakes 210A-210D. As such, it should be understood that while FIG. 3 illustrates a braking subsystem 208, the braking subsystem 208 may be removed from the braking system 142 such that the output line 240 from the shuttle valve 206 may be directly or indirectly connected to the brakes 210A-210D via lines 250.

Regarding the brakes 210A-210D, it should be understood that while four brakes are shown, any number of brakes could be utilized. Moreover, the braking system 142 may have only a single brake or may have any number of brakes based on the application. Additionally, with regards to the type of brakes, the brakes 210A-210D may be any type of brake used to control the motion of a vehicle, such as the vehicle 100. In the example shown in FIG. 3, the brakes 210A-210D are disc brakes. However, it should be understood that other types of brakes could be utilized, such as drum brakes.

If the brake system 142 includes the braking subsystem 208, the braking subsystem 208 may be an antilock braking system that receives an input, in the form of a fluid or gas having a pressure, from the output line 240 of the shuttle valve 206. The braking subsystem 208 converts this pressure to a value that indicates how the one or more brakes 210A-210D should operate. Moreover, if the pressure from the output line 240 is fairly large, the braking subsystem 208 may actuate one or more calipers of the brakes 210A-210D, if the brakes 210A-210D are disc brakes, such that the vehicle 100 suddenly stops. Conversely, if the pressure from the output line 240 is fairly low, the braking subsystem 208 may actuate one or more calipers of the brakes 210A-210D, if the brakes 210A-210D are disc brakes, such that the vehicle 100 slowly stops.

The braking subsystem 208 may control the brakes 210A-210D via one or more electrical motors or may utilize a hydraulic/pneumatic pressure from a gas or fluid provided to line 250 to actuate the movement of one or more components of the brakes 210A-210D to cause the brakes to either slow the vehicle 100 down or release the brakes allowing movement of the vehicle 100.

As stated before, the braking subsystem 208 may be an antilock braking system. As such, the braking subsystem 208 causes the actuation of the brakes 210A-210D such that they slow the vehicle down 100 without locking the wheels during the braking, thereby maintaining traction with the road surface and allowing the operator to maintain more control over the vehicle 100.

Again, the braking subsystem 208 may be optional. If the braking subsystem 208 is not present within the braking system 142, the fluid or gas output from the shuttle valve 206 will be provided, either directly or indirectly, to the brakes 210A-210D to actuate the brakes 210A-210D in response to the fluid or gas output from the shuttle valve 206.

As such, the brake control module 181 causes the processor(s) 110 to either allow the brake-by-wire system 204 to control the brakes 210A-210D when the vehicle 100 is in the first mode (autonomous mode) or allow the mechanical braking system 202 to control the brakes 210A-210D when the vehicle 100 is in the second mode (shared control mode) either by itself or with the brake-by-wire system 204.

The processor(s) 110 may be in communication with the brake-by-wire system 204 such that when the vehicle 100 is in the second mode (shared control mode), the processor(s) 110 causes the brake-by-wire system 204 to generate (or reduce) a pressure that is generally less than the pressure provided by the mechanical braking system 202, thus allowing the mechanical braking system 202 to control the brakes 210A-210D. Conversely, when in the first mode, the operator of the vehicle 100 is generally not interacting with the brake pedal 214, thus preventing a significant pressure from being generated within the chamber 224 of the master cylinder 220. This essentially allows the brake-by-wire system 204 to control the brakes 210A-210D.

Additionally, when the vehicle 100 is in the second mode (shared control mode), pressure generated by the brake-by-wire system 204 may be based on information from a brake pedal sensor 122, which may monitor the movement of the brake pedal 214. As such, the brake-by-wire system 204 may output an appropriate pressure to the shuttle valve 206 using information obtained from the brake pedal sensor 122, while the mechanical braking system 202 may output a pressure to the shuttle valve 206 based on the force provided to the brake pedal 214 from the operator. Ultimately, whichever pressure is greater will be provided to the brakes 210A-210D or the braking subsystem 208.

The operator of the vehicle 100 may dictate the mode in which the vehicle 100 is operating. In one example, when the vehicle 100 is operating in the first mode (autonomous mode), the act of the operator stepping on the brake pedal 214 may cause the vehicle 100 to switch from the first mode to the second mode (shared control mode). Moreover, a brake pedal sensor 122 that can monitor the position and/or movement of the brake pedal 214 may receive information that can be provided to the processor(s) 110, which can then switch the vehicle 100 from the first mode to the second mode. If the operator wishes the vehicle to switch from the second mode (shared control mode) to the first mode (autonomous mode), the operator may utilize another input, such as an input from the input system 130 of FIG. 1. Also, as another example, instead of or in addition to using the actuation of the brake pedal 214 to change modes, the actuation of other pedals, such as an accelerator pedal, may also be used.

When the vehicle 100 is in the first mode (autonomous mode), the control of the brakes 210A-210D is performed by the brake-by-wire system 204. However, in the second mode (shared control mode), the brakes 210A-210D may be controlled by both the mechanical braking system 202 and the brake-by-wire system 204. Which system controls the brakes 210A-210D is dictated by the shuttle valve 206. As explained previously, whichever pressure generated by the mechanical braking system 202 or the brake-by-wire system 204 is greater, controls the brakes 210A-210D.

The shared control of the brakes 210A-210D when the vehicle 100 is in the second mode may be advantageous when combined with active safety systems. Moreover, if it is determined by the processor(s) 110 of the vehicle 100 that a collision is imminent using information from one or more environment sensor(s) 124, the processor(s) 110 can cause the brake-by-wire system 204 to generate an appropriate pressure by increasing the pressure to actuate the brakes 210A-210D to prevent or reduce the severity of a collision. By generating this pressure by the brake-by-wire system 204, the active safety system can essentially override the operator's input provided by the mechanical braking system 202.

Additionally, the braking system 142 has advantages regarding providing braking feedback to the operator when the vehicle 100 operates in the second mode. As it is generally well known, hydraulic/pneumatic braking systems provide superior feedback to the operator by generating an appropriate backpressure to the brake pedal 214. As such, the operator of the vehicle 100 has the advantages of receiving excellent feedback by the brake pedal 214 but also receiving the advantages of having the brake-by-wire system 204 intervene when appropriate.

It should also be noted that the operator of the vehicle 100 also can actuate the brakes 210A-210D in an emergency, such as situations involving a failure of the brake-by-wire system 204. For example, if it appears that the vehicle 100 is heading for a collision and the operator wishes to intervene, the operator can actuate the brake pedal 214, which will cause the vehicle 100 to enter into the second mode from the first mode or remain in the second mode. In this situation, the second mode is now an emergency mode, wherein pressure generated within the chamber 224 of the master cylinder 220 caused by the rapid actuation of the brake pedal 214 by the operator 210 is provided to the braking subsystem 208 and/or the brakes 210A-210D to cause the vehicle 100 to slow or stop. In this emergency mode, the brakes 210A-210D may be controlled entirely by the mechanical braking system 202.

Figure 4:
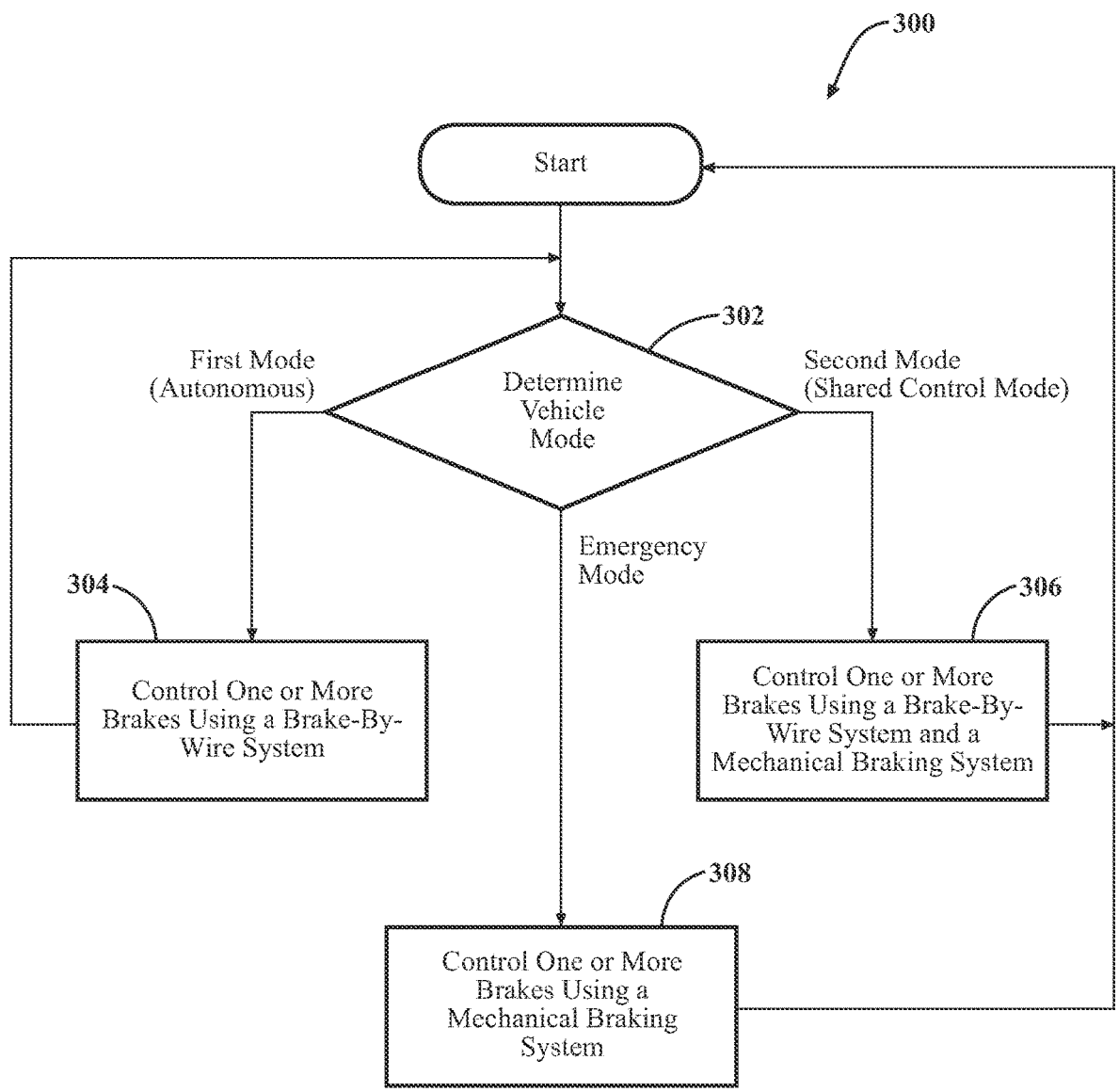
FIG. 4 illustrates a method for controlling one or more brakes of the vehicle.

Referring to FIG. 4, a method 300 for controlling one or more brakes of the vehicle is shown. The method 300 will be described from the viewpoint of the vehicle 100 of FIG. 1 and the braking control system 170 of FIG. 2. However, it should be understood that this is just one example of implementing the method 300. While method 300 is discussed in combination with the braking control system 170, it should be appreciated that the method 300 is not limited to being implemented within the braking control system 170 but is instead one example of a system that may implement the method 300.

In step 302, the brake control module 181 causes the processor(s) 110 to determine the mode in which the vehicle 100 is operating. In some cases, the operator of the vehicle 100 may select which mode the vehicle 100 is in by using the input system 130. If the vehicle 100 is in the first mode of operation (autonomous mode), the brake control module 181 may cause the processor(s) 110 to monitor the brake pedal sensor 122 to determine if the brake pedal 214 has been actuated by the operator. Upon actuation by the operator, the brake pedal sensor 122 will send a signal to the processor(s) 110, wherein the brake control module 181 causes the processor to determine that the vehicle 100 is now in a second mode.

As explained previously, when the vehicle 100 is the first mode, the vehicle 100 may be in an autonomous mode, wherein the vehicle 100 can generally pilot itself from one location to another with little to no operator input. In the second mode, the vehicle 100 may be operating in a non-autonomous or semi-autonomous mode, wherein the vehicle 100 requires inputs from the operator to travel from one destination to another. If it is determined that the vehicle 100 is operating in a first mode, the method 300 proceeds to step 304. In step 304, the brake control module 181 causes the processor(s) 110 to control the one or more brakes 210A-210D using the brake-by-wire system 204.

If it is determined in step 302 that the vehicle 100 is operating in a second mode (shared control mode) the method 300 proceeds to step 306, wherein the brake control module 181 causes the processor(s) 110 to control the brakes 210A-210D using the brake-by-wire system 204 and the mechanical braking system 202. The processor(s) 110 may be in communication with the brake-by-wire system 204 such that when the vehicle 100 is in the second mode (shared control mode), the processor(s) 110 causes the brake-by-wire system 204 not to generate pressure that is greater than the pressure provided by the mechanical braking system 202, thus allowing the mechanical braking system 202 to control the brakes 210A-210D. As such, when in the second mode, the mechanical braking system 202 may solely control the brakes 210A-210D. However, as explained previously, in the second mode, the brake-by-wire system 204 may provide supplemental control to the brakes 210A-210D when necessary. For example, if it is determined by the processor(s) 110 that the vehicle 100 may collide with another object, the processor(s) 110 may instruct the brake-by-wire system 204 enough pressure to actuate the brakes 210A-210D, effectively overriding the mechanical braking system 202.

Returning to step 302, the brake control module 181 may also cause the processor(s) 110 to determine if the vehicle 100 is an emergency mode. This may occur in situations where it is determined that the brake-by-wire system 204 has failed. For example, if the brake-by-wire system 204 is unable to generate enough pressure to provide to the shuttle valve 206, it may be determined that the brake-by-wire system 204 has failed. Additionally, in the event that power is severed to the brake-by-wire system 204 or cannot be provided to the brake-by-wire system 204 due to some catastrophic vehicle failure, the brake control module 181 may cause the processor(s) 110 to determine that the vehicle 100 is in an emergency mode.

If the vehicle 100 is an emergency mode, the method proceeds to step 308, wherein control of the brakes 210A-210D may be provided solely by the mechanical braking system 202. The brake control module 181 may cause the processor(s) 110 to instruct the brake-by-wire system 204 not to generate a pressure greater than the pressure generated by the mechanical braking system 202 to allow the mechanical braking system 202 to solely control the brakes 210A-210D.

As such, the system and method for controlling the brakes 210A-210D of the vehicle 100 have the unique advantage of allowing the brake-by-wire system 204 to control the brakes 210A-210D when the vehicle 100 is an autonomous mode and for allowing a shared control of the brakes 210A-210D when the vehicle is operating in a semi-autonomous or non-autonomous mode. The shared control of the brakes 210A-210D allows the operator to generally control the brakes 210A-210D through pressure generated by the master cylinder 220 when actuating the brake pedal 214. However, if it is determined that the vehicle 100 is in danger of a collision and that the operator is not taking appropriate corrective action, the brake-by-wire system 204 can take control of the situation by generating a pressure greater than the pressure generated by the mechanical braking system in providing this pressure to the brakes 210A-210D and/or the braking subsystem 208 to slow the vehicle 100 down or bring the vehicle 100 to a stop.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As stated previously, the vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as immediate for a particular process or determination to be made, or that enables the processor to keep up with some external process.

In arrangements in which the sensor system 120 includes a plurality of sensors, the sensors can work independently. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one example, the vehicle sensor(s) 121 may include the brake pedal sensor 122, which may be able to measure one or more conditions of the brake pedal 214, such as the movement of the brake pedal 214 any forces acting upon the brake pedal 214.

In one or more arrangements, the vehicle sensor(s) 121 other vehicle sensor(s) 123 as well. The other vehicle sensor(s) 123 can be configured to detect and/or sense position and orientation changes of the vehicle 100, such as, for example, based on inertial acceleration. In one or more arrangements, the other vehicle sensor(s) 123 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The other vehicle sensor(s) 123 can be configured to detect, and/or sense one or more characteristics of the vehicle 100. In one or more arrangements, the vehicle sensor(s) 121 can include a speedometer to determine a current speed of the vehicle 100.

The sensor system 120 can include one or more environment sensor(s) 124 configured to acquire, and/or sense driving environment data. "Driving environment data" includes data or information about the external environment in which an autonomous vehicle is located or one or more portions thereof. For example, the one or more environment sensor(s) 124 can be configured to detect, quantify, and/or sense obstacles in at least a portion of the external environment of the vehicle 100 and/or information/data about such obstacles. Such obstacles may be stationary objects and/or dynamic objects. The one or more environment sensor(s) 124 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

For example, in one or more arrangements, the environment sensor(s) 124 can include one or more radar sensors 125, one or more LIDAR sensors 126, one or more sonar sensors 127, and/or one or more cameras 128. In one or more arrangements, the one or more cameras 128 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, or arrangement, or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the vehicle's geographic location 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 1, the processor(s) 110 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, directly or indirectly.

The vehicle 100 can include one or more actuators 150. The actuators 150 can be any element or combination of elements operable to modify, adjust, and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In this document's context, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling one or more brakes of a vehicle comprising:
   a processor; and
   a memory in communication with the processor and having a brake control module, the brake control module having instructions that, when executed by the processor, cause the processor to:
      control the one or more brakes of the vehicle when the vehicle is in a first mode using a brake-by-wire system by selectively providing a first pressure to the one or more brakes from the brake-by-wire system via a shuttle valve, and
      control the brake-by-wire system such that the one or more brakes of the vehicle are controlled using a mechanical braking system when the vehicle is in a second mode by reducing the first pressure such that a second pressure is provided via the shuttle valve to the one or more brakes from a master cylinder that is in mechanical communication with a brake pedal.

2. The system of claim 1, wherein the shuttle valve provides at least a portion of the first pressure to the one or more brakes when the first pressure is greater than the second pressure and provides at least the portion of the second pressure to the one or more brakes when the second pressure is greater than the first pressure.

3. The system of claim 1, wherein the first mode is autonomous vehicle mode and the second mode is one of a shared control mode and an emergency control mode.

4. The system of claim 1, wherein the brake control module further includes instructions that, when executed by the processor, cause the processor to, when the vehicle is in the second mode and when a collision involving the vehicle is imminent, increase the first pressure from the brake-by-wire system such that a portion of the first pressure is provided via the shuttle valve to the one or more brakes.

5. The system of claim 1, wherein the brake control module further includes instructions that, when executed by the processor, cause the processor to, in response to an input, change the vehicle from the first mode to the second mode.

6. The system of claim 5, wherein the input is an actuation of the brake pedal.

7. A method for controlling one or more brakes of a vehicle comprising the steps of:

controlling the one or more brakes of the vehicle when the vehicle is in a first mode using a brake-by-wire system by selectively providing a first pressure to the one or more brakes from the brake-by-wire system via a shuttle valve; and controlling the brake-by-wire system such that the one or more brakes of the vehicle are controlled using a mechanical braking system when the vehicle is in a second mode by reducing the first pressure such that a second pressure is provided via the shuttle valve to the one or more brakes from a master cylinder that is in mechanical communication with a brake pedal.

8. The method of claim 7, further comprising the steps of:
providing, via the shuttle valve, at least a portion of the first pressure to the one or more brakes when the first pressure is greater than the second pressure; and
providing, via the shuttle valve, at least the portion of the second pressure to the one or more brakes when the second pressure is greater than the first pressure.

9. The method of claim 7, wherein the first mode is autonomous vehicle mode and the second mode is one of a shared control mode and an emergency control mode.

10. The method of claim 7, further comprising the steps of:
determining, when the vehicle is in the second mode, when a collision involving the vehicle is imminent; and
increasing the first pressure from the brake-by-wire system such that a portion of the first pressure is provided via the shuttle valve to the one or more brakes.

11. The method of claim 7, further comprising the step of in response to an input, changing the vehicle from the first mode to the second mode.

12. The method of claim 11, wherein the input is an actuation of the brake pedal.

13. A non-transitory computer-readable medium having instructions that, when executed by a processor, cause the processor to:
control one or more brakes of a vehicle when the vehicle is in a first mode using a brake-by-wire system by selectively providing a first pressure to the one or more brakes from the brake-by-wire system via a shuttle valve; and
control the brake-by-wire system such that the one or more brakes of the vehicle are controlled using a mechanical braking system when the vehicle is in a second mode by reducing the first pressure such that a second pressure is provided via the shuttle valve to the one or more brakes from a master cylinder that is in mechanical communication with a brake pedal.

14. The non-transitory computer-readable medium of claim 13, further comprising instructions that, when executed by the processor, cause the processor to:
determine, when the vehicle is in the second mode, when a collision involving the vehicle is imminent; and
increase the first pressure from the brake-by-wire system such that a portion of the first pressure is provided via the shuttle valve to the one or more brakes.

* * * * *